United States Patent [19]
Abel et al.

[11] Patent Number: 5,930,425
[45] Date of Patent: Jul. 27, 1999

[54] HIGH DENSITY COUPLING MODULE

[75] Inventors: John N. Abel, Avon; Richard Michael Flynn, Noblesville, both of Ind.

[73] Assignee: Lucent Technologies Inc.

[21] Appl. No.: 09/063,505

[22] Filed: Apr. 21, 1998

[51] Int. Cl.⁶ ................................................ G02B 6/36
[52] U.S. Cl. .............................. 385/53; 385/54; 385/55
[58] Field of Search .................... 385/53–60, 76, 385/77, 78, 133, 134–139

[56] References Cited

U.S. PATENT DOCUMENTS

| | | |
|---|---|---|
| 4,934,785 | 6/1990 | Mathis et al. ...................... 350/96.21 |
| 5,067,783 | 11/1991 | Lampert .................................... 385/60 |
| 5,123,071 | 6/1992 | Mulholland et al. ...................... 385/53 |
| 5,212,752 | 5/1993 | Stephenson et al. ...................... 385/78 |
| 5,274,729 | 12/1993 | King et al. ............................... 385/134 |
| 5,418,875 | 5/1995 | Nakano et al. ............................ 385/77 |

*Primary Examiner*—Phan T. H. Palmer

[57] ABSTRACT

A high density optical fiber coupling strip has two buildout members, each of which has a mating surface. Each mating surface has formed thereon a footprint that is identical for each member, so that the mating surface, when abutted together mesh with each other in proper alignment, thereby aligning the members, and can then be joined by welding or similar means. Regardless of the connector type to be received by each member, the footprints insures that the members will be properly mated, thus making possible hybrid coupling strips as well as unitary strips.

11 Claims, 6 Drawing Sheets

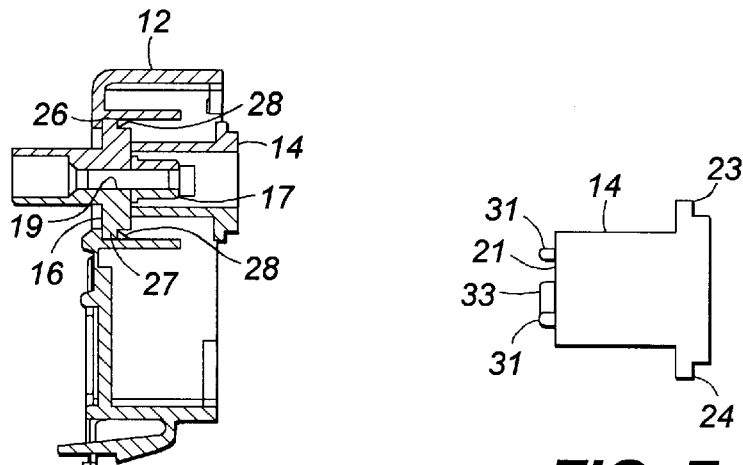
FIG. 3
FIG. 7
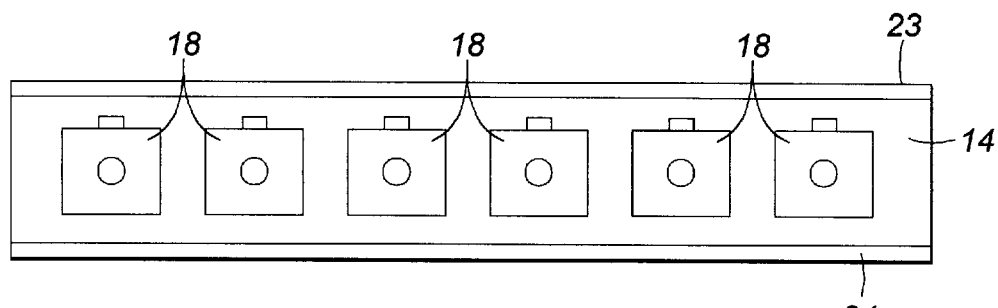
FIG. 4
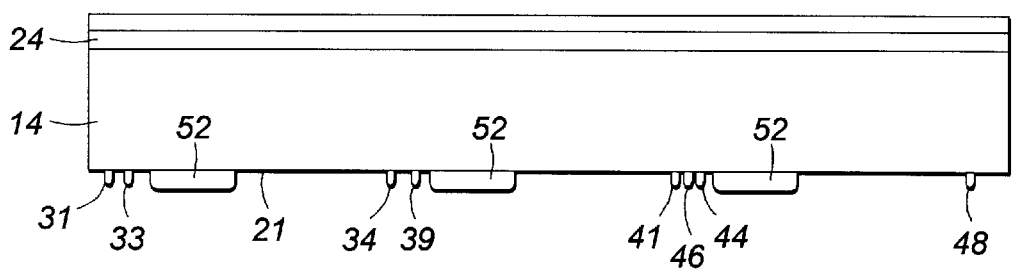
FIG. 5

HIGH DENSITY COUPLING MODULE

FIELD OF THE INVENTION

This invention relates to coupling modules for optical fiber connections and, more particularly, to high density coupling modules for use, primarily, with panel mounting.

BACKGROUND OF THE INVENTION

Optical fiber transmission systems, in many instances, involve one or more panel mountings wherein a plurality of optical fiber connectors on one side of the panel are connected to a plurality of connectors on the other side of the panel through modular members such as adapters or buildouts or similar pass through devices. Desirably, such devices for holding connectors are mounted in the panel, but the connectors themselves are not connected to incoming or outgoing fiber paths until needed to provide service. The devices which are used to accommodate interconnections are referred to as couplings which, as pointed out, may take the form of adapters or a buildout system, which is a form of adapter and most often comprises a buildout block and a buildout member which, together form a buildout system.

There are, in the prior art, a number of different types of ferrule connectors, there being no universally accepted standard ferrule connector. Among these are the ST connector, shown in U.S. Pat. No. 4,934,785 of Mathis et al, the SC connector, shown in U.S. Pat. No. 5,212,752 of Stephenson et al., and other connectors such as the FC or LC connectors. Desirably, an interconnection arrangement, such as the buildout system, should be capable of accommodating each type of connector in any combination. A buildout system which is capable of accommodating ST as well as FC connectors is shown in U.S. Pat. No. 5,067,783 of Lampert. Each buildout block includes a tubular portion and provisions for receiving a buildout which is adapted to receive an ST connector or an FC connector. Thus, the connection may be between like connectors or between different connectors.

In U.S. Pat. No. 5,274,729 of King et al. there is disclosed a universal optical fiber buildout system which can be tailored for connection between any desired pair of connectors, whether of the same type or different types, in any desired combination. The buildout system of that patent includes a buildout block for insertion in an aperture in a panel and having a portion extending from one side of the panel for receiving an optical fiber connector. Any one of three buildout blocks may be used in order to receive an ST, SC, or FC connector. Secured to the buildout block by means of a latching arrangement is a buildout which extends from the front side of the panel and is configured to receive any one of the three types of connectors. The latching arrangement between the buildout block and the buildout is the same for any combination thereof. All of the combinations shown are for individual coupling, with each buildout block having an assigned aperture in the panel. Thus, while accomplishing the desired end of versatility or accommodation of different types of connectors used on either side of the panel, the individual arrangement make the assembly of a high density connection arrangement tedious.

In U.S. Pat. No. 5,123,071 of Mulholland et al., there is shown a buildout system for duplex connector arrangements in which an adapter comprises first and second substantially identical buildout blocks connected back to back for receiving duplex push-pull type connectors, which arrangement apparently lacks the universality of the King et al. arrangement, as well as apparently not being adaptable to high density applications. In U.S. Pat. No. 5,418,875 of Nakano et al. there is shown an adapter comprising first and second members connected together for receiving optical connectors. The arrangement is shown as being adaptable for high density applications, but no details of such an application are set forth.

In U.S. patent application Ser. No. 08/857,402 of Stephenson, filed May 16, 1997, and assigned to the present assignee, there is disclosed a buildout system which allows for the buildouts and the connectors to be assembled without the necessity of rotational movement, requiring only straight line push and pull for making or breaking connections. As a consequence, the connectors can be readily used in high connector to density applications using ganged fiber coupling buildouts. In a ganged configuration, the buildout latches to the buildout block and the buildout block latches to the panel, thus there are numerous latching members in the assembly. The Stephenson arrangement represents a large step forward in the gang mounting of connectors in high density applications. However, under certain circumstances it would not appear to be necessary to use a high density coupling arrangement of the complexity of the Stephenson arrangement where economy of the connecting structure is a consideration, and where simplicity is much to be desired.

SUMMARY OF THE INVENTION

The present invention is a coupling strip for high density applications which is of unitary structure and which may be snapped into the distribution module without the necessity of latching a buildout block and a buildout together, and yet which retains the advantages of the Stephenson device in that it is non-rotational.

In a preferred embodiment of the invention, the coupling strip comprises a first modular member apertured and constructed to receive a plurality of connectors of particular connector type, and which has a mating surface. The strip also comprises a second modular member apertured and constructed to receive a plurality of connectors of the same type as the first member, or of a connector type different therefrom, and which also has a mating surface. It is a feature of the invention that each mating surface, regardless of the connector type to be received by the first or second modular member, has a footprint that is identical to the footprints of all of the other mating surfaces on the several modular members wherein each member receives a different connector. Thus, the first and second modular members may be joined at their mating surfaces by simply reversing one of the members and held together by suitable means, such as ultrasonic welding, to form a coupling strip. The strip thus formed may receive, for example, SC connectors on one side and ST connectors on the other, SC and FC, ST and FC or, of course, SC and SC, ST and ST, or FC and FC. Where connections are between the same types of connectors, e.g., SC to SC, the two strips forming the assembly are identical. Each of the first and second members has transversely extending rails thereon which are adapted to mate with latches in the distribution modules regardless of which member is inserted into the module, to hold the connector strip in place.

The footprint of the mating surface of each modular member is an arrangement of ridges and grooves for alignment and/or bonding surfaces extending vertically between the connector apertures and horizontally or laterally along the surface both above and below the connector apertures. The ridges are sized to fit within the grooves, thereby orienting the two modular members relative to each other and also defining the points at which to two members are welded together. An arrangement of locating or centering pins and holes are also part of the footprint and, being spaced from the weld points, serve to maintain the modular members in their properly centered relationship. In those apertures which, depending upon the connector type, contain coupling sleeves, the sleeves are entrapped in their proper position within the coupling strip formed by the two modular members when welded or otherwise affixed together.

The coupling strip of the invention is a simple, low cost, easily installed strip which accomplished most of the ends of prior art devices in an efficient manner. In those systems where high density coupling is a necessity, the coupling strips of the invention, being both low cost and easily installed, afford an economical way of accommodating the numerous closely spaced connectors.

The numerous features and advantages of the present invention will be apparent from the following detailed description, read in conjunction with the accompanying drawings.

BRIEF DESCRIPTION OF THE DRAWINGS

FIG. 3 is a cross-section along the line 1—1 of FIG. 2;

FIG. 4 is a front elevation view of a buildout member of the present invention;

FIG. 5 is a plan view of the member of FIG. 4;

FIG. 7 is an end elevation view of the member of FIG. 4;

DETAILED DESCRIPTION

Figure 1:
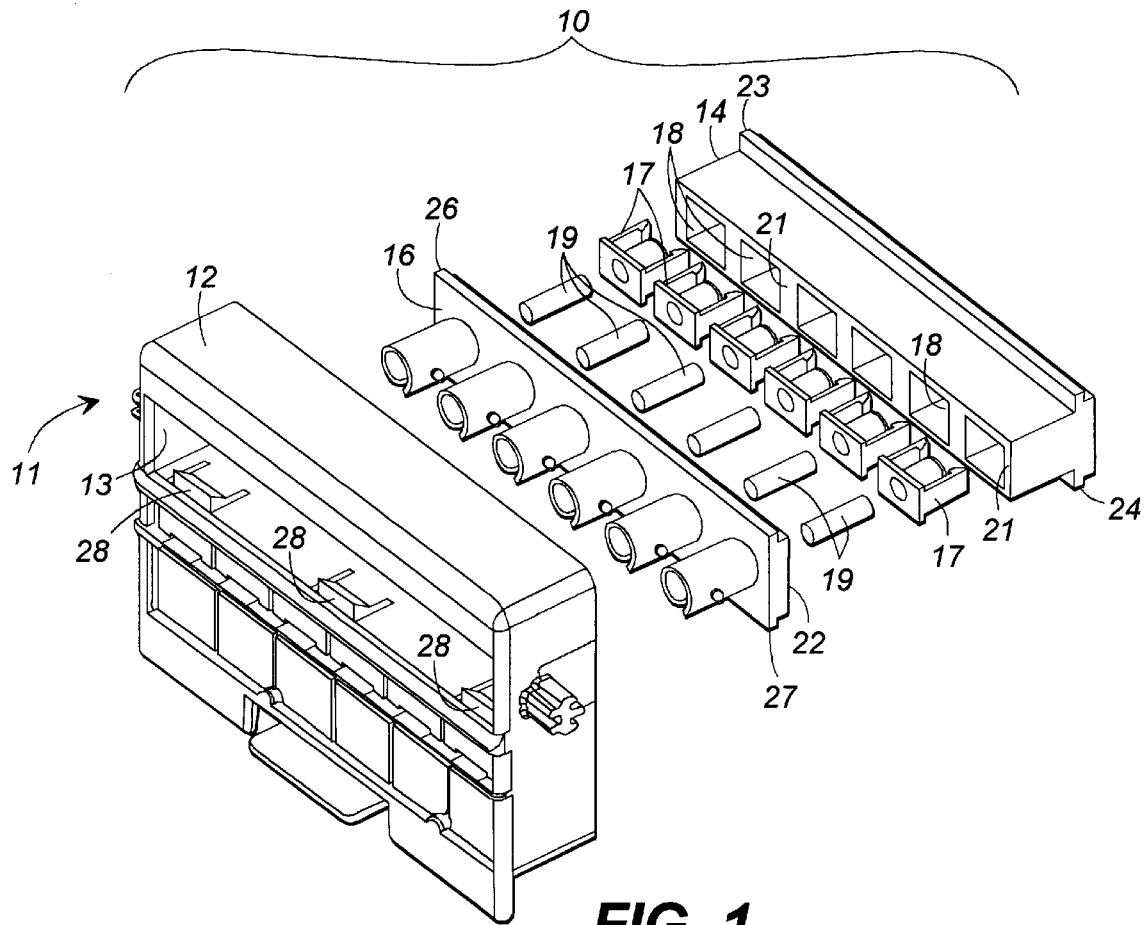
FIG. 1 is an exploded view of a hybrid coupling arrangement embodying the principles of the present invention.

In FIG. 1 there is shown an exploded view of a high density optical coupling arrangement 10 embodying the principles of the present invention, and demonstrating the adaptability thereof to a hybrid coupling system. The arrangement 10 comprises a distribution module 11 comprising a housing 12 having a transverse opening 13 therein for receiving a buildout system comprising a buildout block 14 for receiving a plurality, such as six, SC type of optical fiber connectors, not shown, and a buildout 16 for receiving a like plurality of ST type connectors. Buildout block 14 has a plurality of inserts 17 which are adapted to be inserted in the openings 18 of the buildout block and which are adapted to contain sleeves 19, which are designed to contain the ferrules of the SC and ST connectors. Buildout 16 has a plurality of sleeves 15 for receiving the ST type connectors. As will be discussed more fully hereinafter, buildout block 14 has a mating surface 21 and buildout 16 has a mating surface 22 which are designed to mate with each other when the buildout block 14 and the buildout 16 are joined together to make the high density SC to ST coupling strip. Buildout block 14 has transversely extending rails 23 and 24, and buildout 16 likewise has transversely extending rails 26 and 27. When the coupling strip, made up of buildout block 14 and buildout 16 joined together at their mating surfaces 21 and 22, is inserted into the opening 13, depending upon the particular orientation one of the rails 23, 24, 26, or 27 will latch with latching projections 28 located in the housing 12 within the opening 13, to hold the coupling strip in place. It is to be understood that other latching and holding means might be used, such as having a transverse rail within the opening 13 an latching projections on the buildout block and on the buildout.

Figure 2:
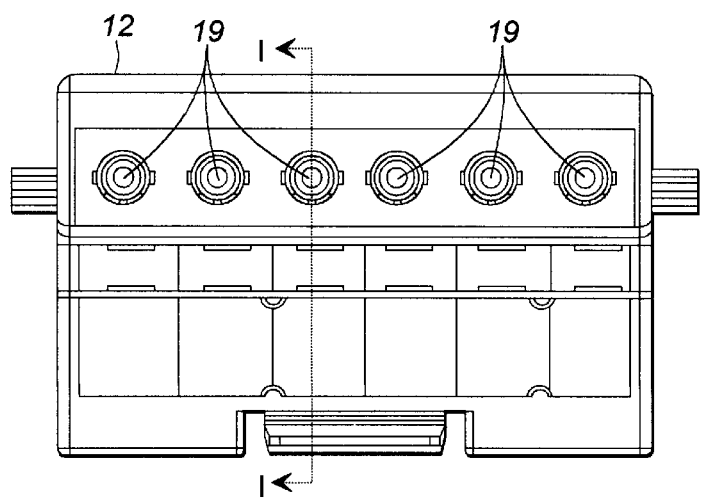
FIG. 2 is a front elevation view of the arrangement of FIG. 1 as assembled.

FIGS. 2 and 3, which is a cross-sectional view along the line 1—1 of FIG. 2, depict the coupling strip as assembled and inserted into housing 12, where it can be seen that there are two sets of latching projections 28. It is to be understood, and will be apparent hereinafter, that the coupling strip embodying the principles of the invention may be mounted as shown, or directly to a patch panel, or to any other piece of apparatus requiring a high density coupling arrangement. The coupling strip is so configured that it is directly insertable into whatever piece of apparatus adapted to receive it without the necessity of any rotational movement or other than a straight forward or axial movement.

FIGS. 4, 5, 6, and 7 are, respectively, a front view, side view, rear view, and end view of an SC type of buildout or buildout block formed in accordance with the principles of the present invention. For simplicity, parts that are the same as shown in FIGS. 1 through 3 bear the same reference numerals. In addition, the member 14 will simply be referred to as a "buildout", or buildout member, it being understood that it may be in either a buildout or a buildout block in the assembled coupling strip.

Figure 6:
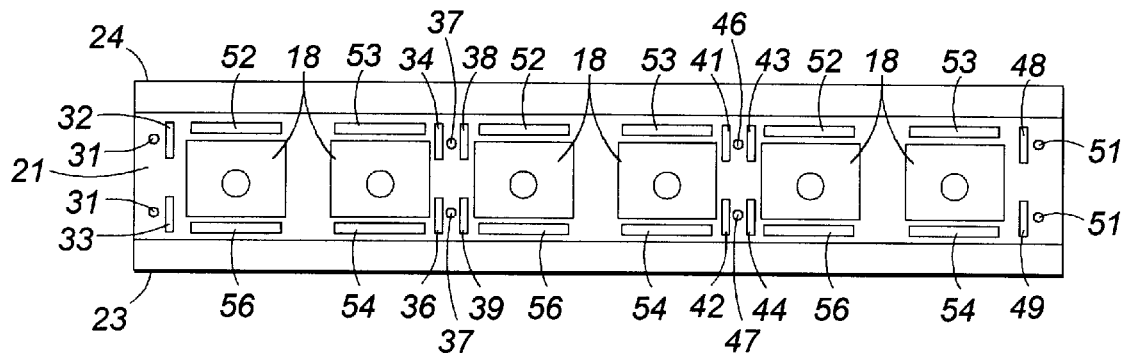
FIG. 6 is a rear elevation view of the member of FIG. 4.
Figure 15:
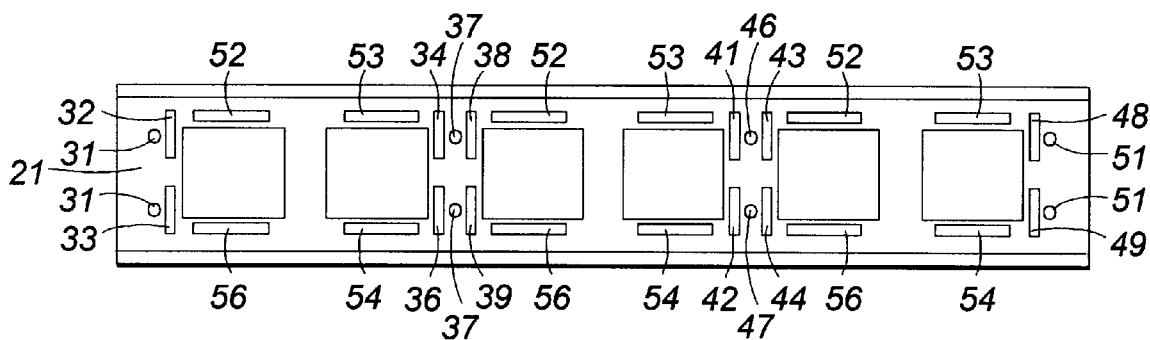
FIG. 15 is an elevation view of the mating surface common to all of the buildouts.

In accordance with the principles of the present invention, and as best seen in FIGS. 6 and 15, the mating surface has a footprint formed thereon by an array of grooves and ridges and locating pins and holes. More specifically, the footprint has first and second ends and upper and lower edges and comprises first and second vertically spaced locating pins 31 at one end of member 14, and a vertically oriented slot 32 aligned with a vertically oriented ridge 33 and vertically spaced therefrom. It is to be understood that such terms as "upper", "lower", and "vertical" refer to the orientations shown in the drawings and are not meant to be restrictive. Slot or groove 32 and ridge 33 are located between pins 31 and the first opening 18, as shown. Between the second and third (from the left, as viewed in FIG. 6) openings 18 or between the first pair and the second pair of openings 18 is a vertically oriented ridge 34 vertically spaced from, and aligned with vertically oriented slot or groove 36 adjacent which are vertically spaced locating holes 37, adjacent which are a vertically oriented slot or groove 38 and a vertically oriented ridge 39 aligned with groove 38 and vertically spaced therefrom, as shown. Similarly, between the fourth and fifth openings 18 that is, between the second and third pair of openings 18 is a an array of ridges 41 and 44 and slots 42 and 43, oriented and spaced in the same manner as ridges 34 and 39 and slots 36 and 38. However, between ridge 41 and slot 43 is a locating pin 46, and between slot 42 and ridge 44 is another locating pin 46. At the right hand (as viewed in FIGS. 6 and 15) end of mating face 21 are a vertically oriented ridge 48 and vertically oriented slot 49, vertically spaced, and adjacent which are locating holes 51, as shown.

Figure 8:
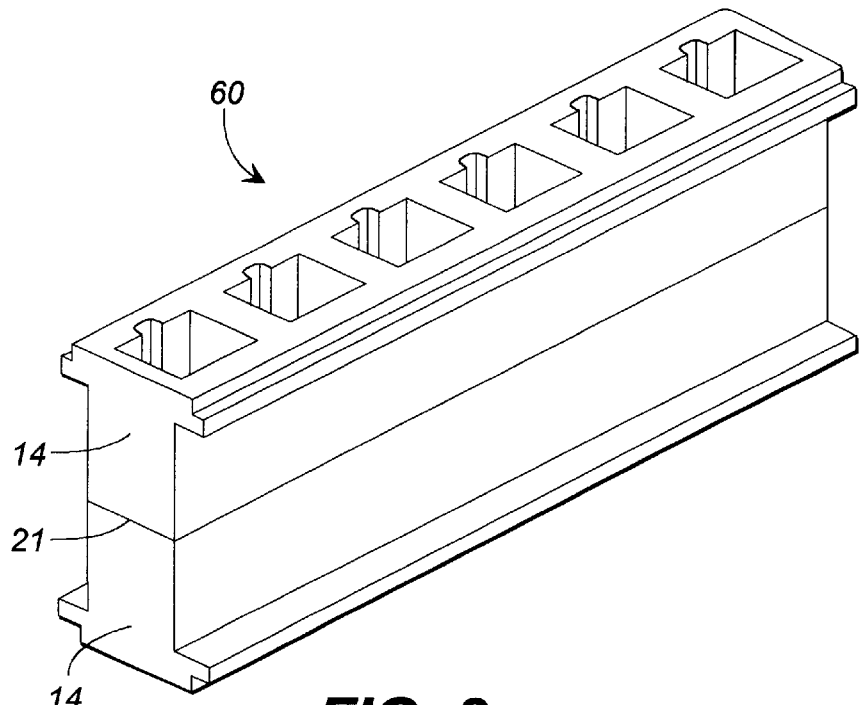
FIG. 8 is a perspective view of an assembled coupling strip utilizing two identical members as shown in FIG. 4.
Figure 9:
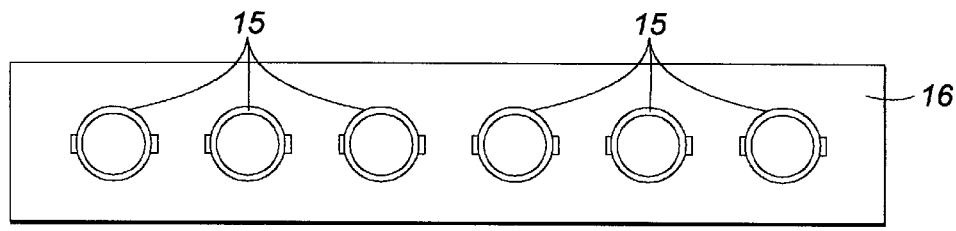
FIG. 9 is an elevation view of a buildout member for ST type couplers.
Figure 10:
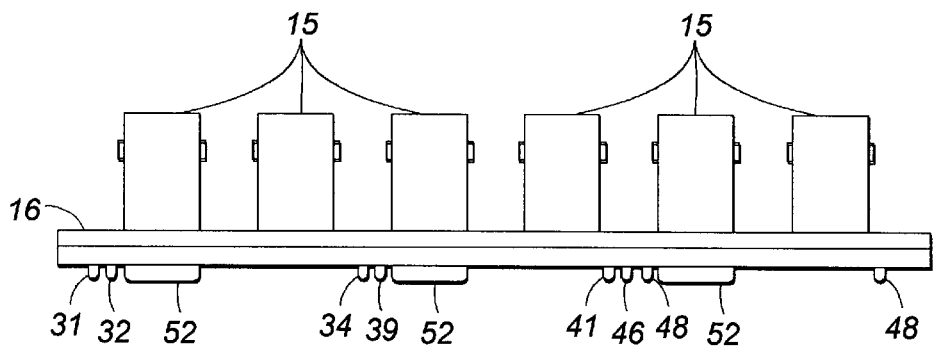
FIG. 10 is a plan view of the member of FIG. 10.
Figure 11:
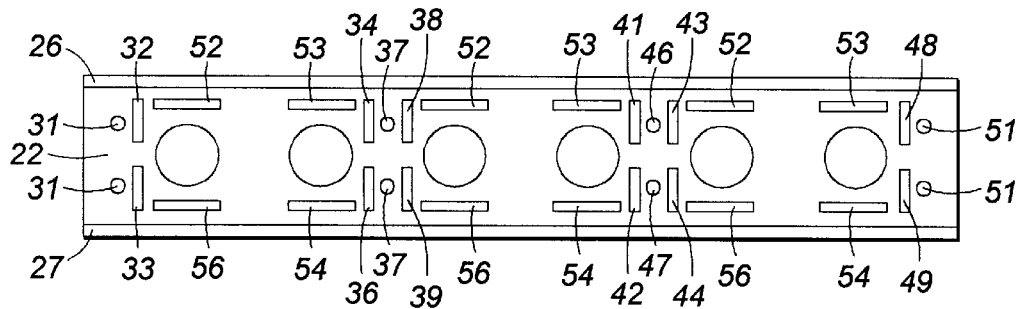
FIG. 11 is a rear elevation view of the member of Fig. 10.
Figure 12:
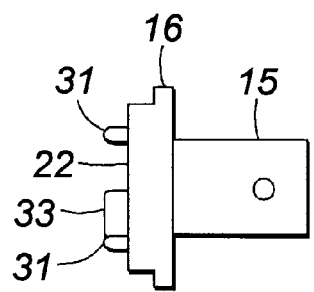
FIG. 12 is an end elevation view of the member of FIG. 10.

Above the openings 18 and extending along the length of mating face 21 are a plurality of horizontally oriented and spaced ridges 52 and slots or grooves 53 which alternate along the length of mating surface 21. In like manner, below the openings is a second array of alternating ridges 54 and grooves 56 which extends along the mating surface 21. When an SC to SC coupling strip is to be formed, such as strip 60, as shown in FIG. 8, two identical members 14 are abutted along their mating surfaces 21. Inasmuch as they are reversed with respect to each other, the footprints mesh, i.e., the ridges fit into the slots or grooves and the locating pins into the holes. The strip is then completed by ultrasonic welding (the parts being of plastic material) at the mating surfaces. During the welding process, the material softens somewhat, especially at the locus of the weld, hence, the ridges do not necessarily afford an accurate alignment of the members 14. For this reason, the locating pins and holes are used for locating purposes inasmuch as they are not located at the weld locus, hence, the pins are less likely to soften during the welding at assembly. As can be seen in FIG. 8, the high density SC to SC coupling strip formed of two identical members 14 requires no latches or other means for jointing the parts together. It is to be understood, however, that the members 14 may, if desired, be connected together, or otherwise joined.

FIGS. 9 through 12 depict, in the same manner as FIGS. 4 through 7, an ST buildout member 16, in which, in accordance with the present invention, the mating surface 22 has a footprint that is the same as that of member 14 in FIGS. 4 through 7. Inasmuch as the footprint is described in detail with reference to FIGS. 4 through 7, it will not be so treated in the discussion of FIGS. 9 through 12. The various locating pins and holes, and ridges and grooves of the footprint have been given the same reference numerals as those in FIGS. 4 through 7 for simplicity.

Figure 13:
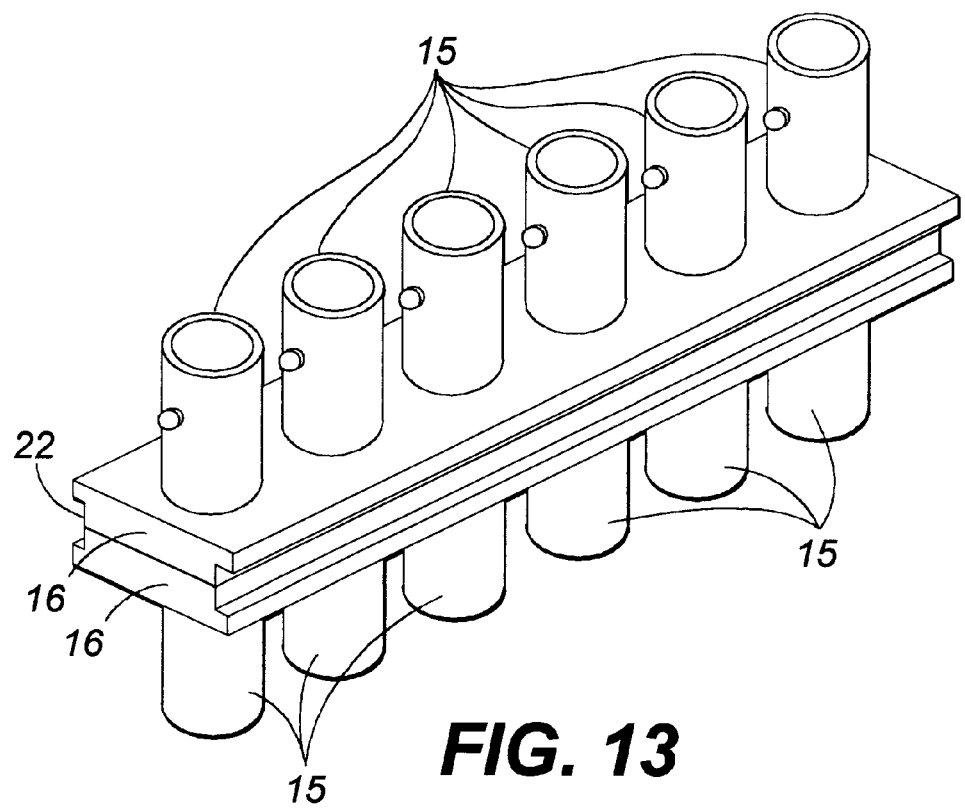
FIG. 13 is a perspective view of an assembled coupling strip using two identical members as shown in FIG. 10.
Figure 14:
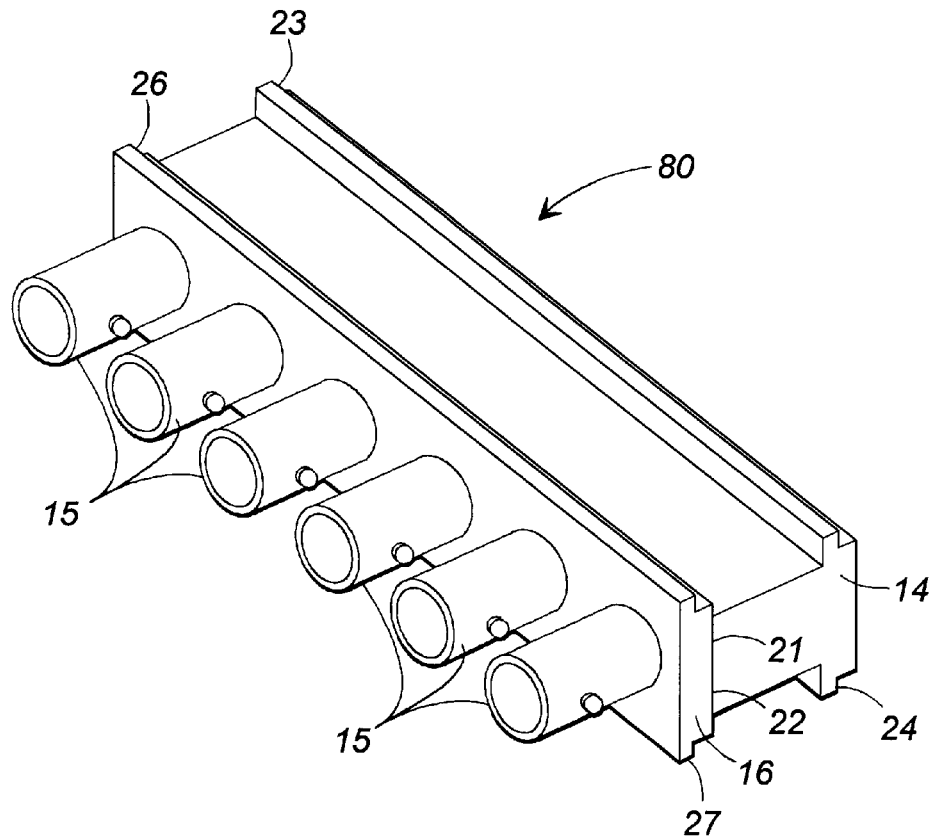
FIG. 14 is a perspective view of an assembled hybrid coupling strip using one member as shown in FIG. 4 and one member as shown in FIG. 10.

When an ST to ST coupling strip is to be formed, such as strip 70 in FIG. 13, two identical members 16 are abutted along their mating surfaces 22, and, because they are reversed with respect to each other, the ridges fit within the grooves and the locating pins within the holes so that alignment is maintained despite the welding operation. FIG. 14 depicts a hybrid SC to ST coupling strip 80 as disclosed in FIG. 1. Inasmuch as mating surfaces 21 and 22 have identical footprints, the members 14 and 16 may be abutted along their mating surfaces, and, as is the case with strips 60 and 70, inasmuch as they are reversed relative to each other, the locating pins fit within the locating holes and the ridges fit within the slots or grooves. Thus, when welded, a single unitary high density coupling strip is formed.

FIG. 15 is a view of the footprint, enlarged for clarity, and depicting the array of ridges, grooves, pins, and holes. It is to be understood that it is possible to use fewer grooves and ridges than shown, so long as a permanent unitary, properly aligned structure is formed. The footprint, in accordance with the invention, is common to other types of buildout members such as, for example, an FC buildout, so that hybrid coupling strips can be fabricated that accommodate SC to ST, SC to FC, and ST to LC connectors. The principles herein disclosed apply also to LC type connectors and buildouts which, however, being normally smaller, might require some modification.

In concluding the detailed description, it should be noted that it will be obvious to those skilled in the art that many variations and modifications may be made to the preferred embodiment without substantial departure from the principles of the present invention. All such variations and modifications are intended to be included herein as being within the scope of the present invention, as set forth in the claims. Further, in the claims hereafter, the corresponding structures, materials, acts, and equivalents of all means or step plus function elements are intended to include any structure, material, or acts for performing the functions with other claimed elements.

We claim:

1. A high density coupling strip comprising:

first and second buildout members, each of said buildout members having first and second ends;

each of said first and second buildout members having a plurality of pairs of apertures therein arrayed between said first and second ends for receiving optical fiber connectors;

said first buildout member further having a mating surface having an upper edge and a lower edge and having a footprint defined by a first ridge and a first slot spaced from each other and vertically aligned with each other between said first end and the first aperture of a first pair, said first slot being located between said first ridge and said upper edge;

a second ridge and a second slot spaced from each other and vertically aligned with each other between the second aperture of said first pair of apertures and the first aperture of a second pair of apertures, said second ridge being located between said second slot and said upper edge;

a third ridge spaced from said second slot and a third slot spaced from said second ridge, said third ridge and said third slot being spaced from each other and vertically aligned with each other and being located adjacent the first aperture of said second pair of apertures with said third slot being located between said third ridge and said upper edge;

a fourth ridge and a fourth slot spaced from each other and vertically aligned with each other between the second aperture of said second pair of apertures and the first aperture of a third pair of apertures, said fourth ridge being located between said second slot and said upper edge;

a fifth ridge spaced from said fourth slot and a fifth slot spaced from said fourth ridge, said fifth ridge and said fifth slot being spaced from each other and vertically aligned with each other and being located adjacent the first aperture of said third pair of apertures with said fifth slot being located between said fifth ridge and said upper edge, and a sixth ridge and a sixth slot spaced from each other and vertically aligned with each other adjacent the second aperture of said third pair of apertures between said second aperture of said third pair and said second end, with said sixth ridge being located between said sixth slot and said upper edge.

2. A high density coupling strip as claimed in claim 1 and further including first and second locating pins adjacent one of said first and second ends of said member.

3. A high density coupling strip as claimed in claim 2 and further including first and second locating holes adjacent the other of said first and second locating ends.

4. A high density coupling strip as claimed in claim 3 and further including third and fourth locating holes located between said second slot and said third ridge and said second ridge and said third slot, and third and fourth locating pins located between said fourth ridge and said fifth slot and between said fourth slot and said fifth ridge.

5. A high density coupling strip as claimed in claim 4 wherein said locating pins are sized to fit within said locating holes.

6. A high density coupling strip as claimed in claim 1 and further comprising a first alternating array of aligned ridges and slots extending between said first and second ends, said first array being located between said apertures and said upper edge.

7. A high density coupling strip as claimed in claim 6 and further comprising a second alternating array of aligned ridges and slots extending between said first and second ends, said second array being located between said apertures and said lower edge, with the slots of said second array being located on the opposite side of an aperture from a ridge of said first array.

8. A high density coupling strip as claimed in claim 7 and further comprising locating means at each of said first and second ends.

9. A high density coupling strip as claimed in claim 8 and further comprising locating means between each of said pairs of apertures.

10. A high density coupling strip as claimed in claim 7 wherein each of said ridges is sized to fit within a corresponding slot.

11. A high density coupling strip as claimed in claim 1 wherein said ridges are dimensional to fit within corresponding slots.

\* \* \* \* \*